US011928757B2

(12) United States Patent
Echevarria Vallespi et al.

(10) Patent No.: US 11,928,757 B2
(45) Date of Patent: Mar. 12, 2024

(54) PARTIALLY TEXTURIZING COLOR IMAGES FOR COLOR ACCESSIBILITY

(71) Applicant: Adobe Inc., San Jose, CA (US)

(72) Inventors: Jose Ignacio Echevarria Vallespi, South San Francisco, CA (US); Rachel Franz, Seattle, WA (US); Paul Asente, Redwood City, CA (US)

(73) Assignee: Adobe Inc., San Jose, CA (US)

( * ) Notice: Subject to any disclaimer, the term of this patent is extended or adjusted under 35 U.S.C. 154(b) by 101 days.

(21) Appl. No.: 17/651,373

(22) Filed: Feb. 16, 2022

(65) Prior Publication Data
US 2023/0260168 A1 Aug. 17, 2023

(51) Int. Cl.
G06T 11/00 (2006.01)
G06T 7/10 (2017.01)
G06T 7/90 (2017.01)
G06T 19/00 (2011.01)

(52) U.S. Cl.
CPC .............. *G06T 11/001* (2013.01); *G06T 7/10* (2017.01); *G06T 7/90* (2017.01); *G06T 19/006* (2013.01); *G06T 2207/10024* (2013.01); *G06T 2207/20092* (2013.01)

(58) Field of Classification Search
None
See application file for complete search history.

(56) References Cited

U.S. PATENT DOCUMENTS

2003/0053685 A1* 3/2003 Lestideau ............ G06V 40/161
382/164
2009/0080773 A1* 3/2009 Shaw .................... G06T 7/187
382/173

2019/0213778 A1* 7/2019 Du ........................ G06T 15/04
2022/0319115 A1* 10/2022 Trojansky .............. B25J 19/021
2022/0400945 A1* 12/2022 Thomason ............ A61B 3/032

OTHER PUBLICATIONS

Sajadi, Behzad, et al. "Using patterns to encode color information for dichromats." IEEE transactions on visualization and computer graphics 19.1 (2012): 118-129.
Flatla, David R., et al. "Colour id: improving colour identification for people with impaired colour vision." Proceedings of the 33rd Annual ACM Conference on Human factors in Computing Systems. 2015.
Colblindor; "Colorblind Colors of Confusion"; Jan. 19, 2009; https://www.color-blindness.com/2009/01/19/colorblind-colors-of-confusion/.

* cited by examiner

*Primary Examiner* — Tapas Mazumder
(74) *Attorney, Agent, or Firm* — Keller Preece PLLC

(57) ABSTRACT

Methods, systems, and non-transitory computer readable media are disclosed for intelligently generating partially textured accessible images. In one or more embodiments, the disclosed systems generate or access a color texture map specific to a given color vision deficiency. For example, the disclosed systems generate a color texture map that divides a color space into one or more textured segment of colors and one or more complementary untextured segments of colors. The disclosed systems can utilize the color texture map to intelligently apply different textures to subsets of pixels that contribute to color vision deficiency confusion. For example, the disclosed system maps pixels from a color image to the color texture map to identify a first subset of pixels corresponding to the textured segment of colors. The disclosed system generates a partially textured accessible image by applying a texture to the first subset of pixels.

20 Claims, 12 Drawing Sheets

PARTIALLY TEXTURIZING COLOR IMAGES FOR COLOR ACCESSIBILITY

BACKGROUND

Recent years have seen a significant improvements in hardware and software platforms for removing color conflicts for viewers with color vision deficiencies (CVD). Indeed, developers have created computer-implemented systems to improve color accessibility by using color combinations that are distinguishable for people with CVDs. In one example, conventional color accessibility systems alter colors to remove problematic color combinations. Some other conventional systems apply patterns over all pixels within a digital image to illustrate different color changes. Although conventional systems have improved color accessibility for individuals with CVD, these systems continue to have significant technical problems with regard to accuracy (e.g., intelligibility and comprehensibility), efficiency, and flexibility of implementing computing devices and corresponding user interfaces.

For example, conventional color accessibility systems are often inaccurate and create undecipherable images. Some conventional systems alter colors to remove color conflicts for viewers with CVDs. However, for dynamic content (e.g., videos, animations, video games, etc.), conventional systems are unable to accurately adjust colors to accommodate real time changes. Some conventional color accessibility systems apply pattern overlays over original colors to help users distinguish between colors. However, these conventional systems generate digital images with densely populated patterns. Thus, in combination with original textures and contours in the image, patterns created by conventional systems are frequently too difficult to comprehend and undermine visibility of the underlying digital image.

In addition, conventional systems are often inefficient. The typical approach used by conventional systems is to alter colors manually or automatically until all colors are free of conflicts for viewers. Although this approach sometimes works in static environments, where content is fixed, the process of altering colors until they are free of conflicts is often to computationally expensive for implementation with dynamic content where colors enter and/or exit scenes at any time. Furthermore, this approach often produces inconsistent results as a single color is changed in different ways across scenes. In addition, conventional systems that apply textures to digital images also utilize excessive computational resources on generating textures for all regions/pixels portrayed in a digital images.

Furthermore, due in part to heavy computational load, conventional systems are often inflexible. As mentioned above, conventional systems are often unable to operate in real-world environments (such as in conjunction with augmented reality devices) or in dynamic real-time environments (such as virtual reality devices). Furthermore, conventional systems are rigid in the patterns that they apply to colors within digital images. Furthermore, conventional systems that apply patterns to colors often rely on fixed directional patterns rotated according to hue angles. The directional component of these rotationally variant patterns is affected when applied in immersive environments where the camera can roll. Thus, conventional systems are often inflexible and inoperable in various dynamic environments as well as accommodating unique contexts and preferences corresponding to individuals with CVDs.

SUMMARY

One or more embodiments provide benefits and/or solve one or more problems in the art with systems, methods, and non-transitory computer readable storage media that intelligently apply pattern overlays to color space sub-segments within digital images for enhanced color accessibility that more accurately, efficiently, and flexibly illustrates distinguishable colors via client device user interfaces. In particular, in one or more implementations, the disclosed systems apply patterns to sub-portions of a digital image that correspond to one or more patterned sub-regions of a color space to make digital images more efficient and intelligible. For example, the disclosed systems can apply textured patterns with respect to sub-regions of a color space where CVD color conflicts occur, thus removing the need to apply textures to each pixel within a digital image. In addition, the disclosed systems allow client devices to flexibly customize patterns for both controlled environments (e.g., virtual reality) and real world environments (e.g., augmented reality). Moreover, the disclosed systems can provide a robust and computationally efficient solution applicable to offline or real time implementations over digital visual content.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
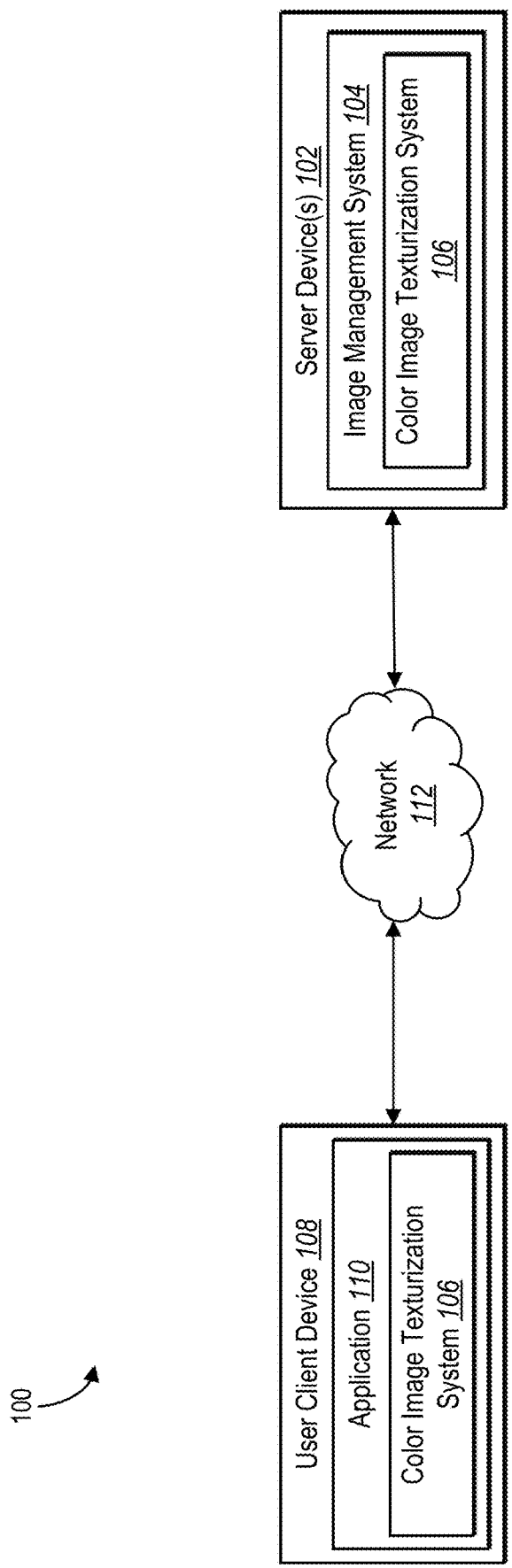
FIG. 1 illustrates an environment in which a color image texturization system operates in accordance with one or more embodiments of the present disclosure.

One or more embodiments of the present disclosure include a color image texturization system that intelligently applies pattern overlays for enhanced color accessibility to reduce CVD color confusion within user interfaces of client devices, while reducing computational overhead and providing additional flexibility in addressing individual accessibility needs. In particular, in one or more implementations, the color image texturization system utilizes a color accessibility filter that applies textures to colors within select sub-regions of a color space that cause CVD color confusion. To illustrate, the color image texturization system creates a color texture map by applying patterns to some segments of a color space based on conflicting color regions. The color image texturization system applies one or more textures to a digital image scene based on the color texture map. The color image texturization system applies such a color accessibility filter to static or dynamic content, including virtual reality or augmented reality. Moreover, in one or more implementations, the color image texturization system allows client devices and corresponding content creators to select textures applicable to particular sub-segments within the color space to flexibly address individual accessibility circumstances.

To illustrate, in some embodiments, the color image texturization system generates a partially textured accessible image from a digital image for a specific CVD. In particular, the color image texturization system maps colors from the digital image to a color texture map. For example, the color image texturization system can generate the color texture map by dividing a color space into a textured segment of colors and an untextured segment of colors according to one or more color conflict boundaries. The color image texturization system further identifies a first subset of pixels having colors mapped to the textured segment of colors and a second subset of pixels from the plurality of pixels having colors mapped to the untextured segment of colors. The color image texturization system applies a texture to the first subset of pixels to generate the partially textured accessible image. Furthermore, the color image texturization system provides a color vision deficiency preferences user interface for customizing textures and colors for the color texture map and partially textured accessible image.

As mentioned above, in some implementations, the color image texturization system generates a color texture map. For example, the color image texturization system creates a color texture map where only some colors in a color space have a corresponding pattern. For instance, color conflicts occur when colors are aligned with respect to confusion lines in a color space. Accordingly, in some embodiments, the color image texturization system divides a color space into conflicting halves or segments where one half receives texture. In some examples, the color image texturization system further segments the divided color space along confusion lines to increase the number of textures and customization options.

In some embodiments, the color image texturization system applies texture to a subset of pixels to generate the partially textured accessible image. More specifically, the color image texturization system evaluates each pixel in a digital image to determine which, if any, texture should be applied. In one example, the color image texturization system determines a region of the digital image corresponding to pixels that fall within a textured segment of the color texture map. The color image texturization system creates texturized pixels or a texture overlay for the region. Moreover, in some embodiments, the color image texturization system applies additional transformations (e.g., orientation variations) to textures to illustrate nuanced hue variations.

In one or more implementations, the color image texturization system provides a color vision deficiency preferences user interface for display via a client device. For example, the color image texturization system provides a color vision deficiency preferences user interface that includes elements for customizing the color texture map and visual properties of textures within the color texture map. To illustrate, the color image texturization system assigns textures to specific segments based on user interaction with one or more texture segment selection elements. In some embodiments, the color image texturization system customizes visual properties of applied textures based on user interaction with one or more visual property selection elements. In some implementations, the color vision deficiency preferences user interface includes additional options for changing the number of segments within a color texture map or other customization options.

Accordingly, the color image texturization system can generate and provide a partially textured accessible image. For example, the color image texturization system can generate a partially textured accessible image by generating an augmented reality overlay that projects textures as an overlay element onto a view of a real-world scene. Similarly, the color image texturization system can provide a partially textured accessible image by adding textures to a virtual reality scene (via a virtual reality device) and/or within a display screen of a mobile device or personal computer. Moreover, because the color image texturization system identifies textures applicable to a subset of pixels of a digital image, the color image texturization system can operate in real-time applications (e.g., as a user plays a virtual reality video game with confusing team colors).

The color image texturization system provides several technical benefits relative to conventional systems. For example, the color image texturization system generates partially textured accessible images that are clear and intelligible relative to conventional systems. In some embodiments, the color image texturization system generates and utilizes color texture maps corresponding to different CVD types to accurately create customized partially textured accessible images in static or dynamic environments. Furthermore, because one or more embodiments of the color image texturization system textures only a subset of pixels (and leaves other pixels untextured), the color image texturization system creates images that are uncluttered and easily readable. Moreover, in one or more embodiments, the color image texturization system applies textures to particular segments of a color space to avoid applying patterns over the most common colors while applying patterns for less frequent colors.

Moreover, in some implementations the color image texturization system improves efficiency relative to conventional systems. For example, the color image texturization system utilizes 2D textures that can be implemented efficiently utilizing a GPU. Furthermore, the color image texturization system utilizes a color texture map having textured segments and untextured segments such that the color image texturization applies textures to only a certain subset of colors within a color space. The color image texturization system utilizes the color texture map to consistently apply transformations to colors, even across dynamic scenes. Accordingly, the color image texturization system can utilize fewer computing resources (e.g., memory and processing power) and improve processing time.

Moreover, the color image texturization system also improves flexibility relative to conventional systems. In particular, as a result of the reduced computational overhead discussed above, the color image texturization system can utilize a color texture map to provide consistent viewing experiences within different environments. For example, the color image texturization system can efficiently identify colors that should be textured using the color texture map, even if colors are new in a scene. The color image texturization system provides consistent viewing experiences that persist across static and dynamic environments, including games, virtual reality, and augmented reality applications. Additionally, the color image texturization system provides flexible customization options for selecting textured colors or segments of colors as well as the specific textures to be applied. The color image texturization system can customize textures to apply across various environments. For example, the color image texturization system can utilize rotationally invariant textures in dynamic environments where a camera is rolling while using rotationally variant textures in static environments.

As illustrated by the foregoing discussion, the present disclosure utilizes a variety of terms to describe features and advantages of the disclosed method. Additional detail is now provided regarding the meaning of such terms. As used herein, the term "partially textured accessible image" refers to a digital image in which some (e.g., a subset of) pixels are associated with texture. In particular, a partially textured accessible image includes color images in which pixels of certain colors are overlaid with texture(s). For example, a partially textured accessible image can include a partially textured photograph, design, frame of a video, a real-world scene portrayed via an augmented reality device, or other textured image.

As used herein, the term color vision deficiency (or simply "CVD") refers to an inability to distinguish between specific different shades of color. For example, a person with a CVD may be unable to perceive differences between the shade of red with a shade of green. Example types of CVDs include protanopia or the inability to perceive red light, deuteranopia or inability to perceive green light, and tritanopia or inability to perceive blue light.

As used herein, the term "digital image" refers to a color image composed of pixels. In particular, a digital image comprises pixels associated with color values. For example, a digital image includes photographs, designs, individual frames of videos, a real-world scene captured via a camera of an augmented reality device, a portrayal of a scene from a virtual reality device, or other types of images.

As used herein, the term "color space" refers to a specific organization of colors. In particular, a color space comprises a model describing a way color may be represented. For example, a color space can refer to a relative color space such as a Red Green Blue (RGB) color space, a hue saturation lightness (HSL) color space, a hue saturation value (HSV) color space, or a YUV color space. In another example, "color space" refers to an absolute color space such as an International Commission on Illumination (CIE) color space including CIE LAB, CIE XYZ, or CIE xyY color spaces.

As used herein, the term "color texture map" refers to a representation of a color space that has been divided or segmented. In particular, a color texture map can include a matrix, table, array, or vector that divides colors in a color space into one or more textured segments of colors and one or more untextured segments of colors. For example, a color texture map can comprise an array that divides a CIE xyY color space into a textured segment of colors and an untextured segment of colors.

As used herein, the term "color deficiency boundary" refers to a border, edge, or boundary that delineates the limits of a segment in a color texture map. In particular, a color deficiency boundary comprises an edge between a textured segment of colors and an untextured segment of colors within a color texture map. For example, a color deficiency boundary can include a curved white point color deficiency boundary determined based on a white point and a copunctual point of the CIE xyY color space (e.g., a circular boundary or linear approximation corresponding to a radius based on the distance between the white point and copunctual point in the color space). A color deficiency boundary can also include confusion color deficiency boundaries determined based on confusion lines that intersect the white point color deficiency boundary (e.g., intersect the white point color deficiency boundary and the copunctual point in the color space).

As used herein, the term "textured segment" refers to a segment in a color texture map corresponding with a texture. In particular, a textured segment includes color values corresponding to a given texture. For example, color values within a textured segment correspond to a particular texture.

As used herein, the term "untextured segment" refers to a segment in a color texture map corresponding with no texture. In particular, an untextured segment includes color values corresponding to no texture. For example, pixels within a digital image that correspond to color values within an untextured segment will not be overlaid with any texture.

As used herein, the term "texture" refers a visual indicator altering the appearance or consistency of a surface. In particular, a texture can refer to a pattern, icon, drawing, or other visual indicator that overlays a subset of pixels in a digital image. For example, a texture can include 2D patterns such as designs, shapes, shading, marks, stripes, and other patterns that may overlay pixels in a digital image.

The following disclosure provides additional detail regarding the color image texturization system in relation to illustrative figures portraying example embodiments and implementations of the color image texturization system. For example, FIG. 1 illustrates a schematic diagram of a system environment (or "environment") 100 in which a color image texturization system 106 operates in accordance with one or more embodiments. As illustrated, the environment 100 includes one or more server device(s) 102, connected to a user client device 108 via a network 112. While FIG. 1 shows an embodiment of the color image texturization system 106, alternative embodiments and configurations are possible.

As shown in FIG. 1, the server device(s) 102 and the user client device 108 are connected via the network 112. As shown, in one or more implementations, each of the components of the environment 100 communicate via the network 112. The network 112 comprises a suitable network over which computing devices are able to communicate. Example networks are discussed in additional detail below in relation to FIG. 11.

As shown, the environment 100 includes the server device(s) 102. The server device(s) 102 generates, stores, receives, and/or transmits digital information including digital images, partially textured accessible images, color texture maps, metadata, etc. In particular, in one or more implementations, the server device(s) 102 provides digital information via web pages or native application to devices such as the user client device 108. The server device(s) 102 is able to communicate with the user client device 108 via the network 112. For example, the server device(s) 102 gathers and/or receives digital information including digital images and/or user customizations from the user client device 108. The server device(s) 102 may also send partially textured accessible images to the user client device 108. In some embodiments, the server device(s) 102 comprise a distributed server where the server device(s) 102 include a number of server devices distributed across the network 112 and located in different physical locations. The server device(s) 102 optionally comprises a content server, an application server, a communication server, a web-hosting server, or a digital content management server.

As further shown in FIG. 1, the server device(s) 102 includes an image management system 104 that generates, collects, provides, stores, modifies, enhances, and/or displays digital images. The image management system 104 can include implementation as part of a virtual reality system or augmented reality system to provide virtual reality environments or augmented reality overlays via the user client device 108. In one or more embodiments, the image management system 104 comprises a color image texturization system 106 that communicates digital information over the network 112. The image management system 104 also performs various backend functions associated with the generation of partially textured accessible images. As illustrated in FIG. 1, the color image texturization system 106 is implemented as part of the image management system 104.

As illustrated in FIG. 1, the environment 100 includes the user client device 108. The user client device 108 may generate, store, receive, and send digital data. For example, the user client device 108 communicates with the server device(s) 102 via the network 112. The user client device 108 illustrated in FIG. 1 may comprise various types of client devices. For example, in some embodiments, the user client device 108 is a mobile device such as a laptop, tablet, mobile telephone, smartphone, etc. In other embodiments, the user client device 108 includes non-mobile devices, such as desktops, or other types of client devices. In some examples, the user client device 108 comprises an augmented reality device or a virtual reality device. Additional details regarding the computing devices, of which the user client device 108 is one implementation, are discussed below with respect to FIG. 11.

The user client device 108 is optionally associated with a user or user account of a color accessibility platform managed by the image management system 104. For instance, the user client device 108 is associated with a creator of digital images. Additionally, the user client device 108 is optionally associated with a user who is viewing a partially textured accessible image generated by the image management system 104 (e.g., as part of a video game, virtual reality scene, or augmented reality overlay to a real-world scene). As mentioned, the user client device 108 communicates with the server device(s) 102. In particular, the user client device 108 uploads and sends digital data including digital images to the server device(s) 102 via the network 112. Additionally, the user client device 108 displays graphical user interfaces including a color vision deficiency preferences user interface to a user associated with the user client device 108.

As illustrated in FIG. 1, the user client device 108 includes the application 110. The application 110 may be a web application or a native application on the user client device 108 (e.g., a mobile application, a desktop application, etc.). The application 110 interfaces with the color image texturization system 106 to provide digital content including digital images, graphical user interfaces, and partially textured accessible images to the device(s) 102. In one or more implementations, the application 110 is a browser that renders a graphical user interface on the display of the user client device 108. For example, the application 110 renders graphical user interfaces for receiving user customizations.

Although FIG. 1 depicts the color image texturization system 106 located on the server device(s) 102, in some embodiments, the color image texturization system 106 is implemented by (e.g., located entirely or in part) on one or more other components of the environment 100. For example, the color image texturization system 106 may be implemented entirely (or in part) on the user client device 108.

To illustrate, the user client device 108 illustrated in FIG. 1 implements the color image texturization system 106. For instance, the color image texturization system 106a may receive a digital image, generate or receive a color texture map, and apply one or more textures to the digital image to generate the partially textured accessible image.

Although the environment 100 includes a single user client device 108, in one or more embodiments, the environment 100 includes multiple user client devices and client devices. For example, the environment 100 include a first user client device 108 associated with a user who creates a digital image. The environment 100 also optionally includes a second user client device 108 associated with a user who views the digital image.

Additionally, the user client device 108 optionally communicates directly with the color image texturization system 106, bypassing the network 112. Moreover, the color image texturization system 106 may access one or more databases housed on the server device(s) 102 or elsewhere in the environment 100.

While FIG. 1 illustrates an example environment in which the color image texturization system 106 operates, the following figures and corresponding discussion provide additional detail regarding how the color image texturization system 106 generates partially textured accessible images in accordance with one or more embodiments. In particular, FIG. 2 and the corresponding paragraphs provide an overview of the color image texturization system 106 generating partially texturized accessible images in accordance with one or more embodiments. By way of overview, FIG. 2 includes a series of acts 200 including an act 202 of generating a color texture map, an act 204 of mapping a plurality of colors to a color texture map, an act 206 of identifying a first subset of pixels, an act 208 of identifying a second subset of pixels, and an act 210 of applying texture to the first subset of pixels.

Figure 2:
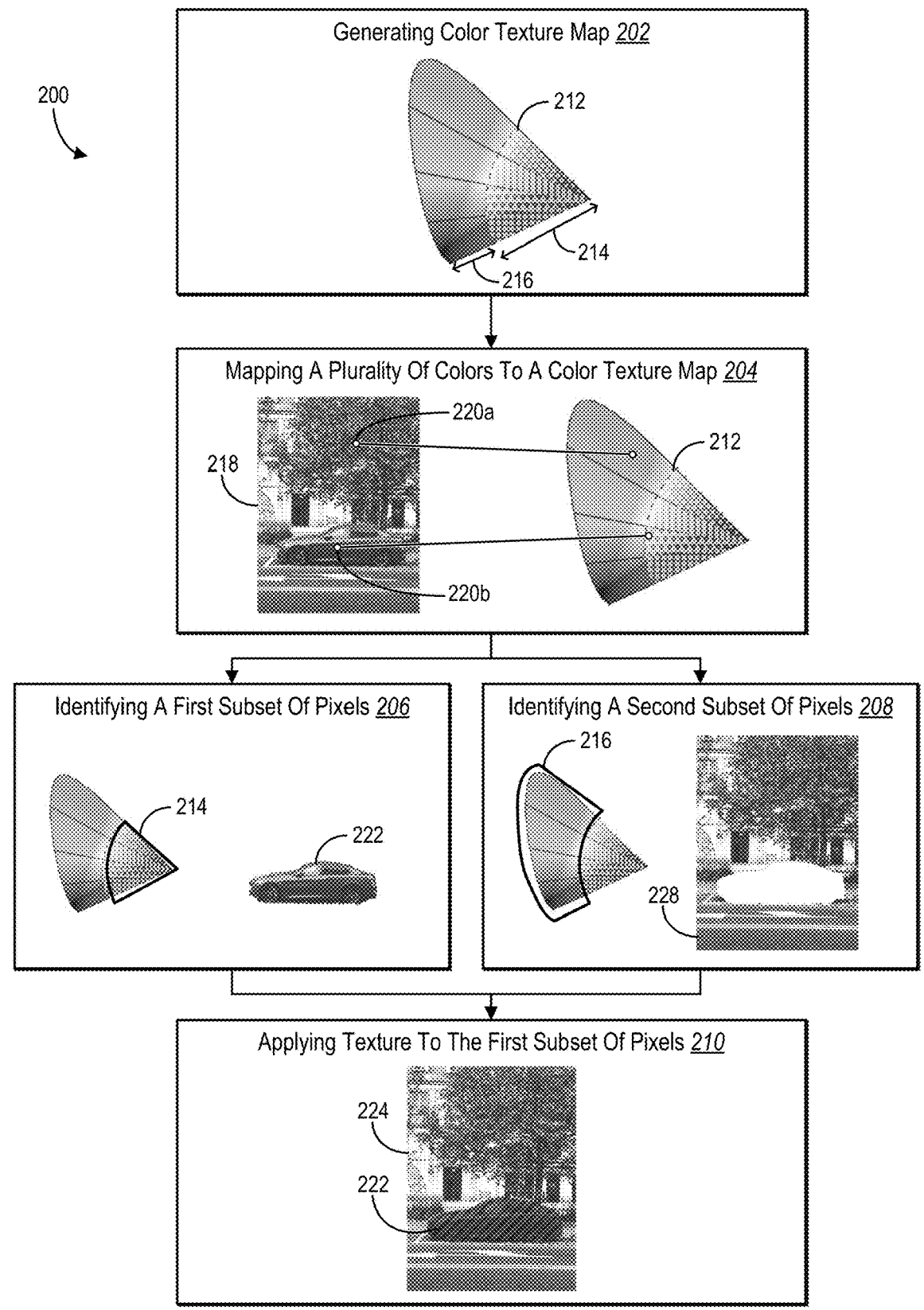
FIG. 2 illustrates an overview diagram of generating a partially textured accessible image in accordance with one or more embodiments of the present disclosure.
Figure 4:
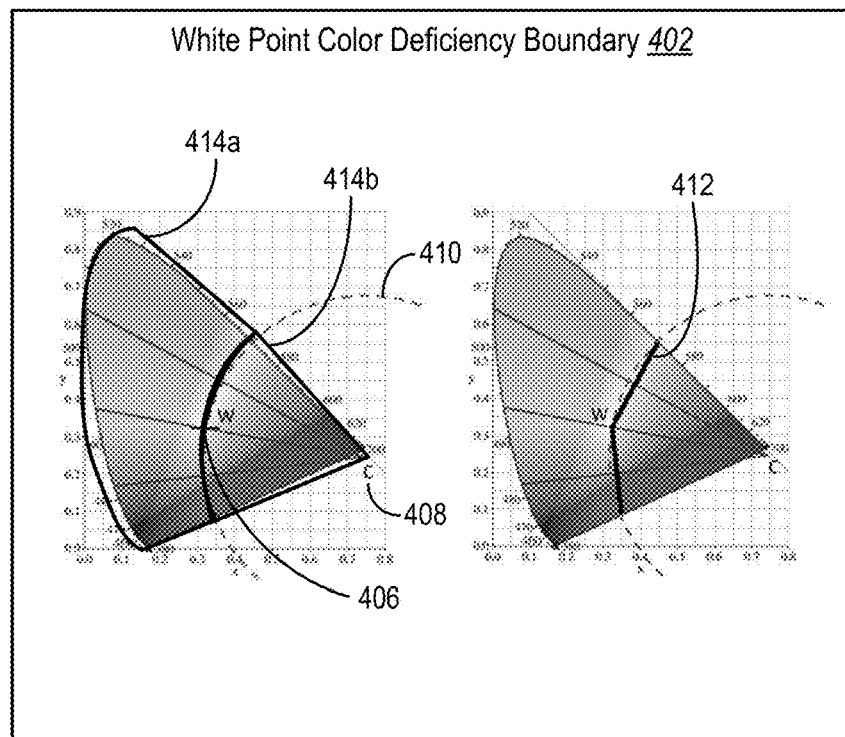
FIG. 4 illustrates example color deficiency boundaries in accordance with one or more embodiments of the present disclosure.
Figure 4:
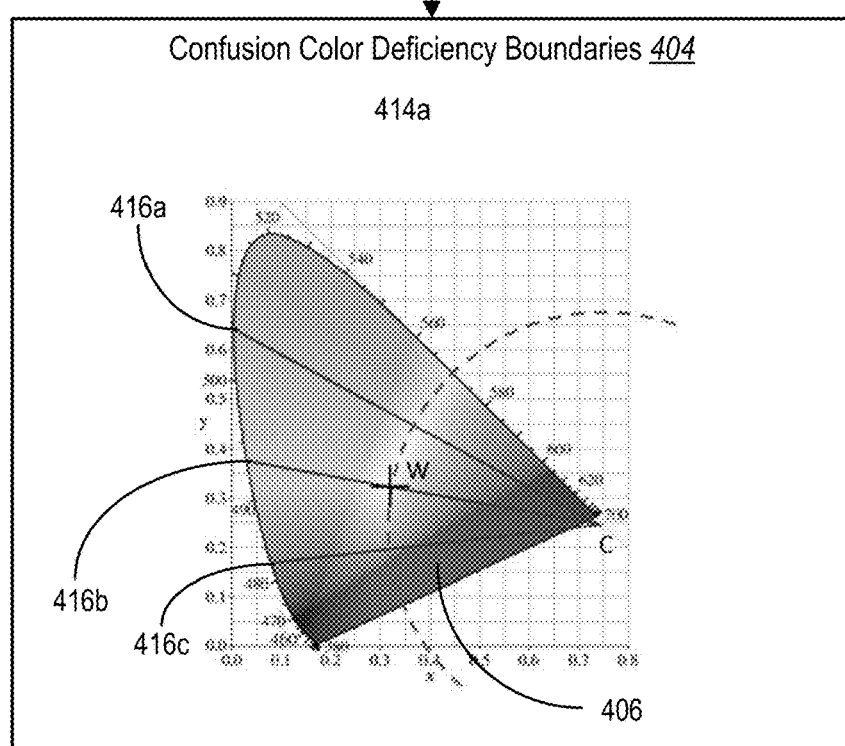

The series of acts 200 includes the act 202 of generating a color texture map. For example, the color texture map comprises a color space divided into at least one textured segment of colors and at least one untextured segment of colors. The textured segment of colors indicates colors in a digital image that will be overlaid by patterns in the final partially textured accessible image. FIG. 2 illustrates a color texture map 212 comprising a textured segment of colors 214 and an untextured segment of colors 216. FIGS. 4 and 5 and the corresponding paragraphs provide additional detail regarding the color image texturization system 106 generating a color texture map in accordance with one or more embodiments.

As illustrated in FIG. 2, the color image texturization system 106 performs the act 204 of mapping a plurality of colors to a color texture map. For example, the color image texturization system 106 maps pixels 220a-220b from a digital image 218 to the color texture map 212. As illustrated, the color image texturization system 106 determines that the pixel 220a has a color mapped to a green value in the color texture map 212 and the pixel 220b has a color mapped to a red value in the color texture map 212.

The color image texturization system 106 further performs the act 206 of identifying a first subset of pixels. In particular, the color image texturization system 106 identifies a first subset of pixels 222 from a plurality of pixels in the digital image 218 having colors mapped to the textured segment of colors 214. To illustrate, the color image texturization system 106 determines that the first subset of pixels 222 have colors within the textured segment of colors 214.

The color image texturization system 106 performs the act 208 of identifying a second subset of pixels. In particular, the color image texturization system 106 identifies a second subset of pixels 228 from the plurality of pixels in the digital image 218 having colors mapped to the untextured segment of colors 216. To illustrate, the greens, whites, and other colors of the pixels 228 are mapped to the untextured segment of colors 216 of the color texture map 212.

The color image texturization system 106 performs the act 210 of applying texture to the first subset of pixels. In particular, the color image texturization system 106 generates a partially textured accessible image 224 by applying texture to the first subset of pixels 222. As illustrated, the color image texturization system 106 generates a textured overlay to cover the pixels 222. The rest of the partially textured accessible image 224 is untextured to give an uncluttered and clean look.

Figure 3A:
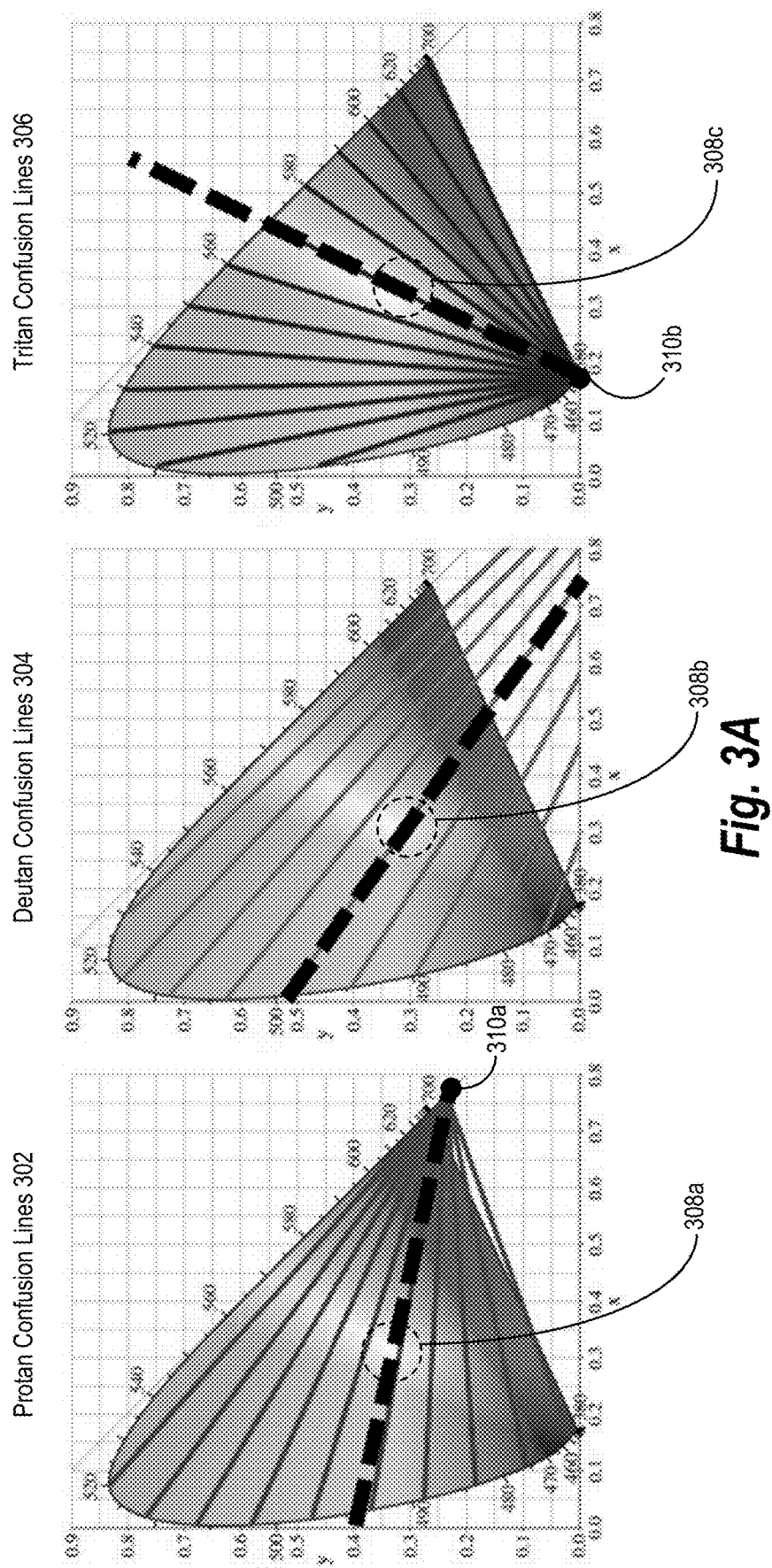
FIGS. 3A-3B illustrate example color vision deficiency types and color conflicts in accordance with one or more embodiments of the present disclosure.
Figure 3B:
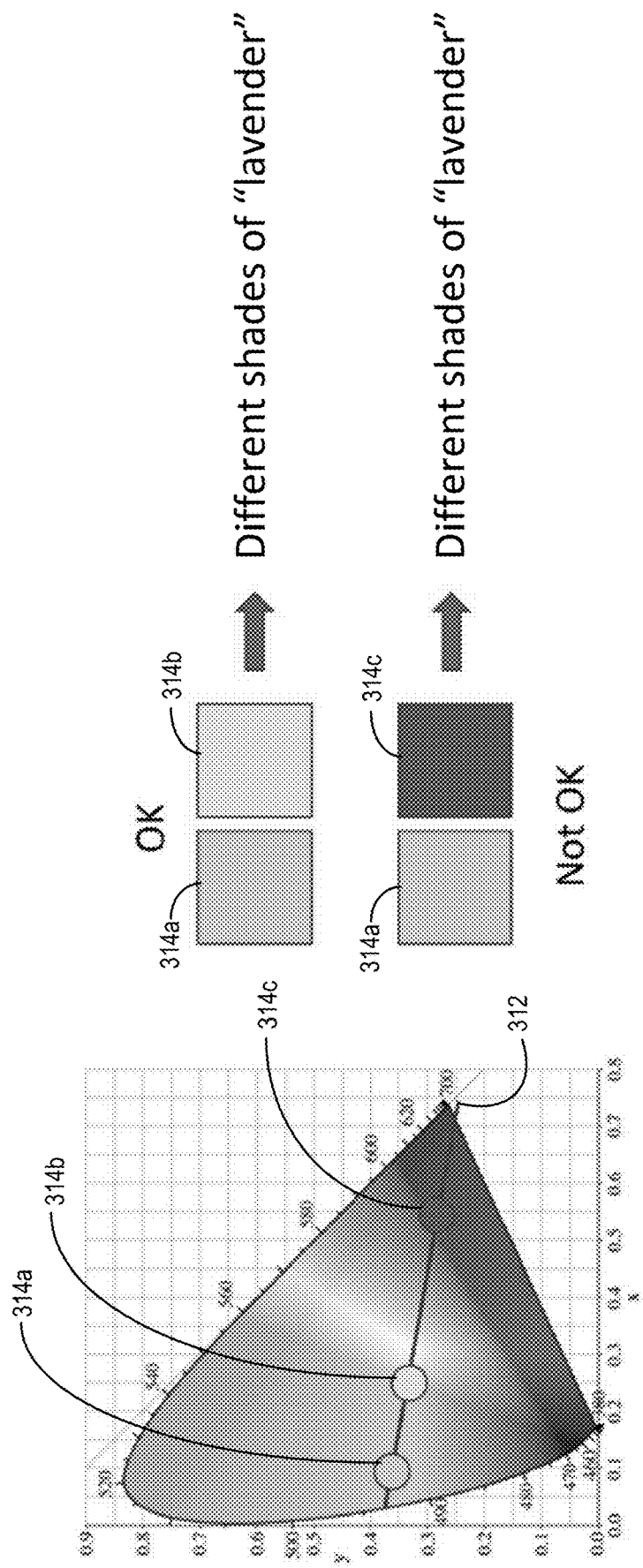

As mentioned, the color image texturization system 106 generates intelligible partially textured accessible images by assigning textures to only a subset of colors. FIGS. 3A and 3B and the corresponding discussion demonstrate how color conflicts occur across different hues. In particular, FIG. 3A illustrates confusion lines for various CVDs and FIG. 3B illustrates example color conflicts across a color line in accordance with one or more embodiments.

FIG. 3A illustrates protan confusion lines 302, deutan confusion lines 304, and tritan confusion lines 306. Generally, confusion lines comprise lines in a color space on which colors cannot be discriminated by a corresponding dichromat. As illustrated, the protan confusion lines 302 intersect at a copunctual point 310a, and the confusion lines 306 intersect at a copunctual point 310b. Although it exists, a copunctual point is not visible for the deutan confusion lines 304 illustrated in FIG. 3A. The confusion lines may also intersect white points 308a-308c. To illustrate, lines passing through the white points 308a-308c are shown as dashed lines.

FIG. 3A illustrates different confusion lines visualized in the CIE xyY color space. For example, the CIE xyY color space includes a 3-dimensional space of colors. In a 3-dimensional space, the confusion lines can be visualized as planes extending upward. FIG. 3A visualizes a 2-dimensional xy slice. Darker colors, including black, exist in layers below the layers illustrated in FIG. 3A. As mentioned, in some embodiments, CVD confusion lines may be visualized in other color spaces including RGB, CIE LAB, and other color spaces. For some of the other color spaces, the color image texturization system 106 determines other types of CVD confusion markers beside straight lines and planes. For instance, CVD confusion markers in other color spaces may include other irregular shapes or boundaries.

FIG. 3B illustrates example color conflicts along a confusion line in accordance with one or more embodiments. FIG. 3B illustrates colors 314a-314c along a protan confusion line 312. Colors along the confusion line may comprise different shades of the same hue. For example, the colors 314a and 314b are two shades of the same blue hue. As shown, the colors 314a and 314b are perceived as two shades of the same lavender hue for an observer with protanopia. The color conflict between the color 314a and the color 314b is minor and can be left uncorrected. More specifically, saturation and lightness help an observer differentiate between the shades like a viewer without CVDs does.

Some color combinations along a confusion line are more problematic, especially when the colors comprise different hues. As illustrated in FIG. 3B, the color 314a and the color 314b are different hues. In particular, the color 314a is blue and the color 314c is red. The color conflict between the color 314a and the color 314c is problematic as the two different hues (blue and red) are incorrectly perceived as different shades of the same hue by a viewer with protanopia. In this instance, the same perceived hue is misleading, so adding a texture to either the color 314a or the color 314c helps disambiguate between them.

As mentioned, the color image texturization system 106 can generate a color texture map so that only some colors in a color space are textured. FIG. 4 and the corresponding discussion detail the color image texturization system 106 dividing colors of a color space into segments. In particular, FIG. 4 illustrates different color deficiency boundaries that the color image texturization system 106 utilizes to divide a color space into segments that can be textured or and untextured in accordance with one or more embodiments. More specifically, FIG. 4 illustrates a white point color deficiency boundary 402 and confusion color deficiency boundaries 404. While FIG. 4 illustrates example protan color deficiency boundaries, the color image texturization system 106 can determine color deficiency boundaries for all CVD types.

In some embodiments, the color image texturization system 106 segments colors in a color space using a white point color deficiency boundary. In particular, the color image texturization system 106 determines the white point color deficiency boundary 402 by using a white point 406 and a copunctual point 408 as references. In some embodiments, the color image texturization system 106 determines conflicting segments 414a-414b comprising the inside and outside of the cylinder 410 centered at the copunctual point 408 with a radius equaling the distance between the white point 406 and the copunctual point 408. The conflicting segments 414a-414b are complementary to each other. The color image texturization system 106 may designate the cylinder 410 as the white point color deficiency boundary 402. In some examples, the color image texturization system 106 assigns texture to only one of the conflicting segments 414a-414b. For example, the color image texturization system 106 may designate the conflicting segment 414a as the textured segment and the conflicting segment 414b as the untextured segment (or vice versa).

In some embodiments, the white point color deficiency boundary 402 comprises a polygonal white point color deficiency boundary 412 instead of a cylindrical color deficiency boundary. In particular, the polygonal white point color deficiency boundary 412 may result in more accurate application of textures over stimuli for viewers with CVDs. In some embodiments, the color image texturization system 106 determines the corners of the polygonal white point color deficiency boundary 412 based on the white point 406. For example, the color image texturization system 106 determines the polygonal white point color deficiency boundary 412 by connecting the white point with points where the cylinder 410 intersects the edge of the color space. Thus, even though the polygonal white point color deficiency boundary 412 of FIG. 4 is composed of two lines the color image texturization system 106 determines those lines from the white point and the copunctual point (and the corresponding radius of the cylinder 410).

In some embodiments, the color image texturization system 106 divides colors in the color space into two segments. In particular, the color image texturization system 106 identifies a single textured segment and a single untextured segment based on the white point color deficiency boundary 402. Additionally, or alternatively, the color image texturization system 106 creates additional segments of colors using one or more confusion color deficiency boundaries described below.

As illustrated in FIG. 4, the color image texturization system 106 further divides colors of a color space into additional segments of colors using the confusion color deficiency boundaries 404. For instance, the color image texturization system 106 further segments the two conflicting segments 414a-414b by utilizing one or more confusion color deficiency boundaries that intersect the white point color deficiency boundary. Confusion color deficiency boundaries track confusion lines for a given CVD. For instance, and as illustrated in FIG. 4, the color image texturization system 106 may add confusion color deficiency boundaries 416a-416c. In some examples, the color image texturization system 106 arbitrarily partitions the color map by adding one or more confusion color deficiency boundaries. For instance, the addition of a single confusion color deficiency boundary results in the creation of four segments of colors. By creating additional segments, the color image texturization system 106 furthers customize textured and untextured segments. More specifically, the color image texturization system 106 may assign textures to segments with more granularity when there are additional textured and untextured segments.

Figure 5A:
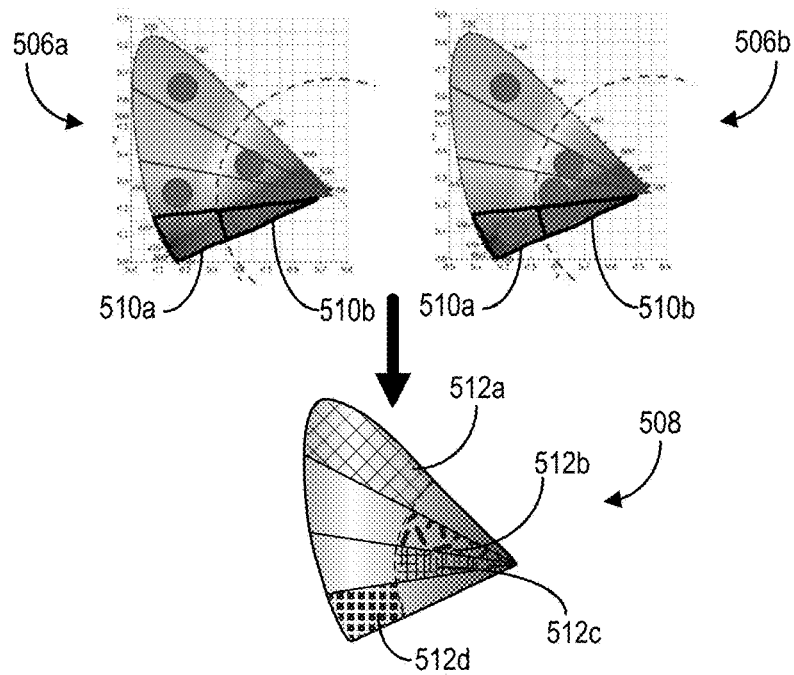
FIGS. 5A-5B illustrate assigning a texture and, optionally, texture transformations to a textured segment in accordance with one or more embodiments of the present disclosure.
Figure 5B:
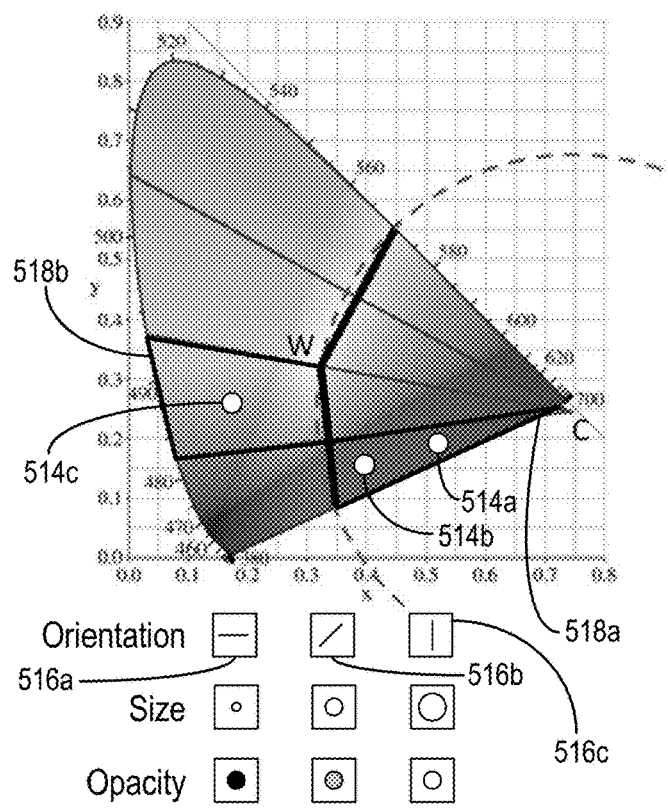

FIG. 4 illustrates the color image texturization system 106 dividing colors of a color space into one or more textured segments and one or more untextured segments. As part of creating a color texture map, the color image texturization system 106 assigns a texture to a segment of colors to designate textured segments. FIGS. 5A-5B illustrates the color image texturization system 106 assigning a texture to a segment of colors in accordance with one or more embodiments. More specifically, with regard to FIG. 5A, the color image texturization system 106 assigns textures for multiple segment of colors and in FIG. 5B, the color image texturization system 106 determines different texture transformations within a segment of colors.

As illustrated in FIG. 5A, the color image texturization system 106 determines a textured segment of colors and an untextured segment of colors for each pair of conflicting segments. As mentioned previously, conflicting segments exist on opposite sides of a white point color deficiency boundary. FIG. 5A illustrates color texture schemes 506a-506b. The color texture schemes 506a-506b include various segments including segments of colors 510a-510b. The segments of colors 510a-510b are conflicting segments. The color image texturization system 106 assigns texture to either one of the segment of color 510a or the segment of color 510b. For example, the color image texturization system 106 assigns textures to the segments marked with dots and leaves the conflicting segment untextured. As illustrated in FIG. 5A, the color image texturization system 106 assigns texture to the segment of color 510b in the color texture scheme 506a while assigning texture to the segment of color 510a in the color texture scheme 506b. A variety of different combinations of textured segments is possible (e.g., with each textured segment paired with a conflicting untextured segment).

As illustrated in FIG. 5A, the color image texturization system 106 assigns a unique texture to each of the textured segments of colors 512a-512d to create a textured color map 508. In some embodiments, a texture is a 2D tile-able texture with an alpha channel for transparency effects such as alpha blending. For example, the color image texturization system 106 assigns a dotted texture to the textured segment of colors 512a, a striped texture to the textured segment of colors 512b, a triangular texture to the textured segment of colors 512c, and a square texture to the textured segment of colors 512d.

With regard to FIG. 5A, the color image texturization system 106 assigns textures to the textured segment of colors 512a-512d based on the color texture scheme 506b. As explained in greater detail below with regard to FIG. 7, the color image texturization system 106 can assign particular textures to particular color segments based on a variety of factors, such as user input or color utilization within the digital image. For example, the color image texturization system 106 can provide a color vision deficiency preferences user interface with selectable elements to customize textures and color segments. Moreover, the color image texturization system 106 can analyze a digital image, determine predominant colors (and/or less predominant colors), and apply textures based on the predominant colors. In particular, the color image texturization system 106 can select textured color segments corresponding to less predominant/less frequent colors in a digital image. In this manner, the color image texturization system 106 generates partially textured accessible image with fewer textures (i.e., easier to see and comprehend).

As shown in FIG. 5B, the color image texturization system 106 also determines a texture transformation corresponding to a color of the textured segment of colors. In particular, although FIG. 5A illustrates selecting different textures for different color segments, in some embodiments the color image texturization system 106 further modifies textures (e.g., for colors within a textured color segment) to further illustrate variations in hue. To illustrate, the color image texturization system 106 applies a single texture with varying pattern to be smoothly interpolated according to hue.

More specifically, the color image texturization system 106 utilizes a first texture transformation corresponding to a first color of a textured segment of colors. FIG. 5B illustrates various texture transformations that the color image texturization system 106 applies in accordance with one or more embodiments. The color image texturization system 106 associates different orientations, sizes, opacity, and other transformations to different colors within a textured segment. FIG. 5B illustrates texture orientations 516a-516c. For example, the color image texturization system 106 applies a first orientation 516a to the texture corresponding with a color 514a and applies a second orientation 516b to the texture corresponding with the color 514b. The color image texturization system 106 further assigns an orientation 516c to another color within the same textured segment.

In some embodiments, the color image texturization system 106 utilizes both approaches illustrated in FIG. 5A and FIG. 5B in applying textures. In particular, the color image texturization system 106 assigns unique textures to each textured segment and further assigns texture transformations to hues or colors within respective textured segments of colors. The color image texturization system 106 can apply a variety of different combinations between texture and texture transformation for a textured segment. To illustrate, the color image texturization system 106 assigns a line texture to a textured segment 518a and a circle texture to a textured segment 518b. The color image texturization system 106 determines a first orientation for the color 514a and a second orientation for the color 514b. The color image texturization system can further determine a size or opacity transformation for a color 514c in the textured segment 518b. In one example, the color image texturization system 106 assigns different orientations to colors within the textured segment 518a while assigning different sizes to colors within the textured segment 518b.

As mentioned, the color image texturization system 106 creates a partially textured accessible image based on a color texture map. In particular, the color image texturization system 106 identifies a first subset of pixels from the digital image having colors mapped to the textured segment of colors and a second subset of pixels from the digital image having colors mapped to the untextured segment of colors. In some embodiments, the color image texturization system 106 converts pixel values of the digital image to match the color space of the color texture map. To illustrate, the color image texturization system 106 converts the plurality of pixels in an RBG digital image to CIE xyY color values based on a CIE xyY color texture map. The color image texturization system 106 further evaluates the plurality of pixels to identify a first subset of pixels corresponding to colors in a textured segment of the color texture map. Thus, the color image texturization system 106 determines the texture and/or texture transformations to apply to pixels in the first subset of pixels.

The color image texturization system 106 further applies a texture to the first subset of pixels to generate a partially textured accessible image. In some embodiments, the color image texturization system 106 determines a textured region of the digital image corresponding to the first subset of pixels. The color image texturization system 106 determines a scaling factor based on pixel coordinates of the digital image. In at least one example, the color image texturization system 106 normalizes pixel coordinates for the digital image between 0 and 1. The color image texturization system 106 applies the scaling factor to the normalized pixel coordinates to control the size of the textured region. The color image texturization system 106 applies the texture by applying a texture pattern to the region utilizing the scaling factor.

Additionally, in some embodiments, the color image texturization system 106 optionally modulates the opacity of the texture pattern. Generally, by modulating the opacity of the texture pattern, the color image texturization system 106 makes transitions between color regions smoother and more aesthetically pleasing. In some embodiments, the color image texturization system 106 variably blends a texture with the plurality of pixels using a color-variant opacity. In one example, the color image texturization system 106 computes the saturation of a pixel value in the first subset of pixels. For instance, the color image texturization system 106 determines how close a pixel value is to a neutral point. In a CIE xyY color space, the neutral point is the white point. The color image texturization system 106 uses the saturation to modulate the opacity of the texture pattern. To illustrate, when a color in a digital image is closer to white, the color image texturization system 106 applies more faded (transparent) texture patterns. When a color in the digital image is stronger or has higher saturation, the color image texturization system 106 increases the opacity of the texture pattern.

Figure 7:
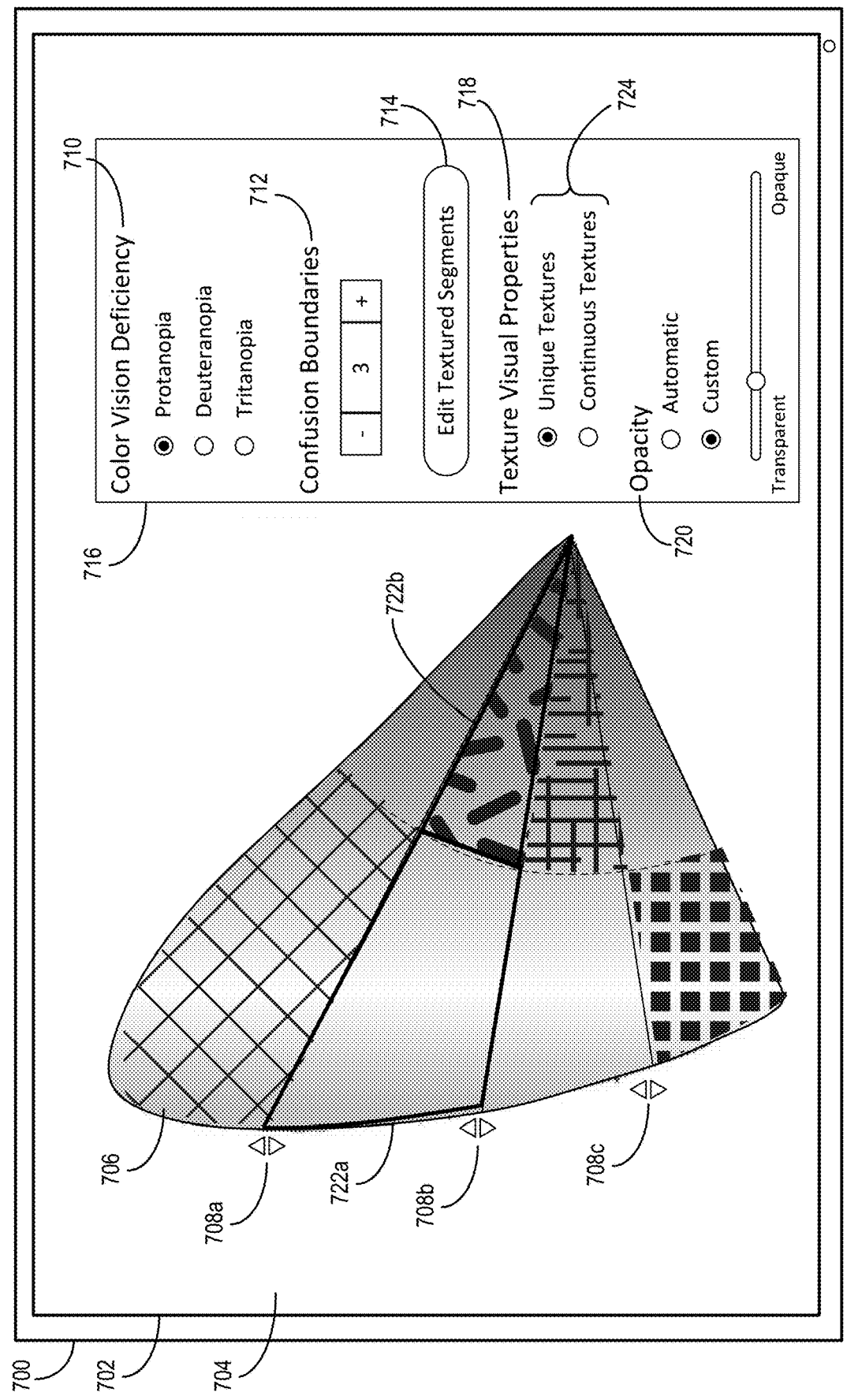
FIG. 7 illustrates an example color vision deficiency preferences user interface in accordance with one or more embodiments of the present disclosure.

In some embodiments, the color image texturization system 106 modulates opacity of the texture pattern based on user input. In particular, the color image texturization system 106 may provide, for display via a color vision deficiency preferences user interface, an opacity customization element. For example, the color image texturization system 106 may provide an opacity selection element for setting a fixed opacity for all texture patterns. In another example, the color image texturization system 106 provides opacity range selection elements to select a range of opacity values that may be used in the partially textured accessible image. FIG. 7 and the corresponding discussion illustrate additional user interface elements for modulating opacity.

Figure 6:
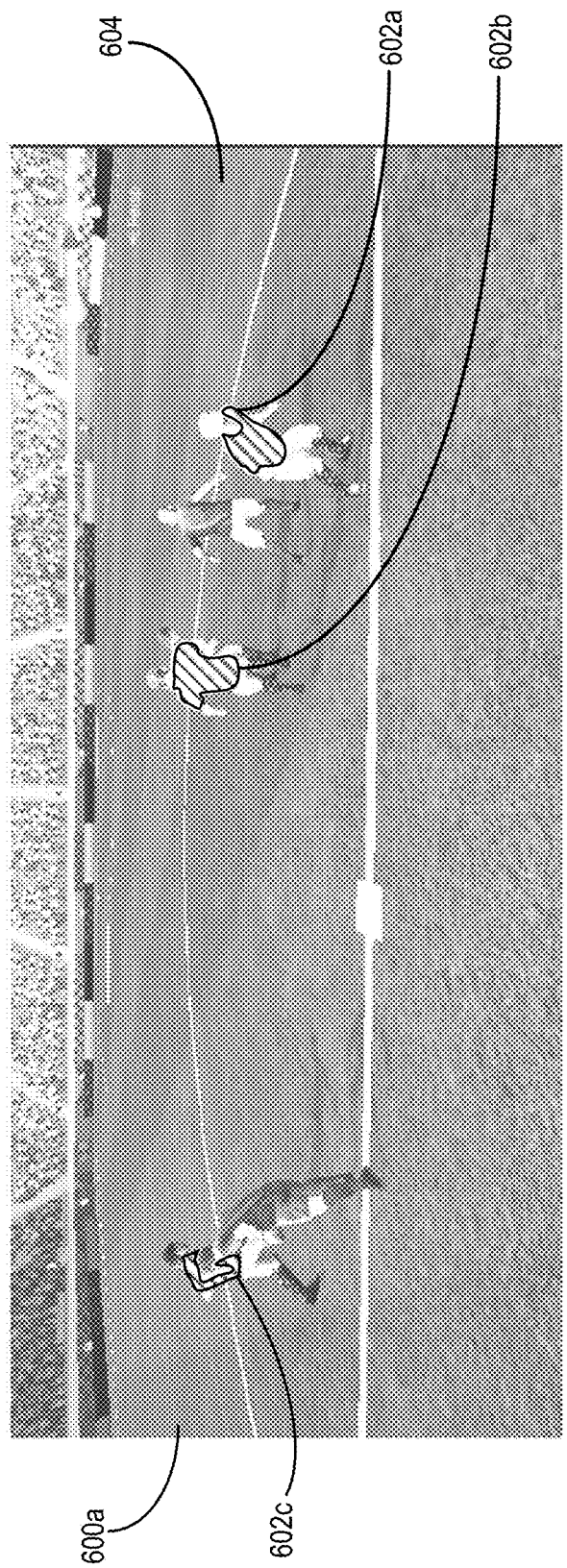
FIG. 6 illustrates partially textured accessible images in accordance with one or more embodiments of the present disclosure.

For example, in one or more embodiments, the color image texturization system 106 utilizes the following algorithm (e.g., by implementation as a GPU filter applied to each pixel):

Algorithm 1
1. Convert RGB to xyY
2. Check region and determine texture pattern to sample
3. Normalize pixel screen coordinates between 0 and 1
4. Apply scaling factor to normalized coordinates to control the size of the pattern
5. Sample texture with scaled coordinates (texture is tileable)
6. Compute color saturation
7. Blend original RGB color and sampled pattern with user controlled opacity saturation FIG. 6 illustrates an example partially textured accessible image in accordance with one or more embodiments. In particular, FIG. 6 includes a partially textured accessible image 600 that illustrate a scene from a video game. Specifically, the partially textured accessible image 600 illustrate a soccer video game with different teams having jerseys that would normally cause CVD confusion. Moreover, because the soccer players are controlled by individual client devices, the players and jerseys dynamically move in real-time (in response to particular user inputs), making it difficult to accurately modify colors according to conventional systems.

As illustrated, however, the color image texturization system 106 generates the partially textured accessible image 600, which includes textured regions and untextured regions to help distinguish between the confusing jersey colors. More specifically, the partially textured accessible image 600 includes textured regions 602a-602c comprising textured pixels and untextured region 604 comprising untextured pixels. As illustrated, the color image texturization system 106 has applied a cross texture pattern to the textured regions 602a-602c, which have the same color and hue. The color image texturization system 106 does not apply any texture pattern to the untextured region 604.

Accordingly, the color image texturization system 106 allows an individual with CVD playing the soccer video game to discern the difference between teams on the field (e.g., one team jersey has cross-hatching and the other team jersey does not). Moreover, the color image texturization system 106 does not unnecessarily clutter or overwhelm the game with textures on every surface/pixel. Rather, as illustrated in FIG. 6, the partially textured accessible image 600 includes targeted texture regions that assist in differentiating confusing colors, while leaving the remaining pixels portraying the scene unaltered.

As mentioned, the color image texturization system 106 can customize textures applied to textured regions in digital images. Accordingly, although the partially textured accessible image 600 illustrates a particular texture, the color image texturization system 106 can overlay a different texture over the textured regions 602a-602c. For example, the color image texturization system 106 can apply a different striped texture to the textured regions 602a-602c. Accordingly, individual client devices and corresponding users can control the textures and colors and customize the resulting partially textured accessible image.

Accordingly, the color image texturization system 106 can generate partially textured accessible images in a variety of environments, including static environments (e.g., fixed photos, paintings, graph designs) or dynamic environments. Examples of dynamic content where colors enter and/or exit scenes over time include videos, animations, videogames, and other content. More specifically, dynamic content includes virtual reality and augmented reality. To illustrate, the video game illustrated in FIG. 6 can be implemented as part of a virtual reality environment. In such circumstances, the color image texturization system 106 generate the partially textured accessible image 600 and portrays it within the virtual reality environment. More specifically, the color image texturization system 106 identifies a digital image from a virtual reality scene portrayed via a virtual reality device. As illustrated, the color image texturization system 106 applies texture to the first subset of pixels within the virtual reality scene.

As mentioned, in some embodiments, the color image texturization system 106 generates partially textured accessible images from real-world scenes for augmented reality devices. In particular, the color image texturization system 106 captures a digital image from a real-world scene via a camera device of an augmented reality device. The color image texturization system 106 applies the texture to the first subset of pixels by providing a texture overlay for display relative to the real-world scene via the augmented reality device. To illustrate, for augmented reality glasses, the color image texturization system 106 can display (via the augmented reality glasses) a texture overlay. Accordingly, when a user views the real-world scene through the augmented reality glasses, the real-world scene includes textures that indicate particular colors to avoid CVD confusion.

The color image texturization system 106 efficiently processes both static and dynamic content. More specifically, the color image texturization system 106 utilizes 2D textures that reduce the resources required to create partially textured accessible images. Furthermore, because the color image texturization system 106 generates color texture maps, the color image texturization system 106 predetermines texture and untextured segments used to add textures to partially textured accessible images. Specifically, the color image texturization system 106 can cache a color texture map to quickly and efficiently determine textures to apply to individual color regions within a digital image. The color image texturization system 106 improves efficiency and accordingly can efficiently process both static and dynamic content in real-time using current mainstream hardware.

As mentioned, the color image texturization system 106 provides various customization options via a color vision deficiency preferences user interface. FIG. 7 illustrates an example color vision deficiency preferences user interface in accordance with one or more embodiments. FIG. 7 illustrates a color vision deficiency preferences user interface 704 displayed on a screen 702 of a client device 700 (e.g., the user client device 108). The color vision deficiency preferences user interface 704 includes a color texture map 706 and a customization element 716.

As illustrated in FIG. 7, the color vision deficiency preferences user interface 704 includes the color texture map 706. The color image texturization system 106 provides various customization options to flexibly define the number of segments and textures in the color texture map to provide consistent viewing experiences within a given environment (or across environments) for easier color identification. For example, the color image texturization system 106 can apply the color texture map 706 consistently within a given environment such as a VR, game, or design. The color image texturization system 106 can further apply the color texture map 706 across several environments including images, AR, and others, to provide a consistent and persistent pattern application. In some embodiments, the color image texturization system 106 provides, for display via the color vision deficiency preferences user interface 704 an environment selection element. The color image texturization system 106 associates the color texture map 706 with one or more environments based on user interaction with the environment selection element.

FIG. 7 further illustrates confusion color deficiency boundary adjustment elements 708a-708c. Based on user interaction with the confusion color deficiency boundary adjustment elements 708a-708c, the color image texturization system 106 changes the locations of the confusion color deficiency boundaries within the color texture map 706. The color image texturization system 106 changes the sizes of segments within the color texture map 706 based on user interactions with the confusion color deficiency boundary adjustment elements 708a-708c. For example, based on determining that the user has selected the up arrow of the confusion color deficiency boundary adjustment element 708b, the color image texturization system 106 moves the current confusion color deficiency boundary above the current location.

As illustrated in FIG. 7, the color vision deficiency preferences user interface 704 includes the customization element 716. Generally, the customization element 716 includes additional user interface elements for further customizing the color texture map 706. In particular, the customization element 716 includes a color vision deficiency selection element 710, a confusion boundaries element 712, a texture segment selection element 714, a visual property selection element 718, and an opacity customization element 720.

As previously mentioned, the color image texturization system 106 utilizes different color texture maps for different color vision deficiency types. Based on user interaction with the color vision deficiency selection element 710, the color image texturization system 106 specifies the type of color texture map used to generate partially textured accessible images. For example, FIG. 7 illustrates a current selection of protanopia. Based on this selection, the color image texturization system 106 uses the color texture map 706 based on protan confusion lines. Based on selection of other options in the color vision deficiency selection element 710, the client device 700 updates the screen 702 to display the appropriate color texture map.

The customization element 716 illustrated in FIG. 7 further includes the confusion boundaries element 712. The color image texturization system 106 changes the number of confusion color deficiency boundaries used within the color texture map 706 based on user interaction with the confusion boundaries element 712. For instance, the color image texturization system 106 may add or remove confusion color deficiency boundaries based on user selection of the subtraction element or the addition element within the confusion boundaries element 712. The client device 700 updates the color texture map 706 to reflect corresponding changes in the number confusion color deficiency boundaries.

FIG. 7 further illustrates the inclusion of the texture segment selection element 714. The color image texturization system 106 assigns textures to user-identified segments based on user interaction with the texture segment selection element 714. Based on selection of the texture segment selection element 714, the color image texturization system 106 may customize which segments in the color texture map 706 will be associated with texture. For instance, based on user selection of the texture segment selection element 714, the color image texturization system 106 provides options to the user to select textured segments in the color texture map 706. In some embodiments, the segments of the color texture map 706 comprise texture segment selection elements. For instance, based on user selection of segment 722*a*, the color image texturization system 106 removes texture from the segment 722*b* and adds texture to the segment 722*a*.

As illustrated in FIG. 7, the customization element 716 also includes the visual property selection element 718. Generally, the color image texturization system 106 customizes visual properties of textures in the color texture map 706 based on user interaction with the visual property selection element 718. The color image texturization system 106 determines textures assigned to the textured segments based on user interaction with the visual property selection element 718. In one embodiment, based on user interaction with the visual property selection element 718, the color image texturization system 106 provides selectable texture options to associate with textured segments. In another example, the textured segments of the color texture map 706 comprise selectable visual property selection elements. To illustrate, based on user interaction with the segment 722*b*, the client device 700 updates the screen 702 to include selectable candidate textures for the segment 722*b*. The color image texturization system 106 updates the color texture map 706 to include a selected candidate texture in the segment 722*b*.

The customization element 716 further includes texture modulation elements 724. The texture modulation elements 724 include selectable elements for determining whether the color image texturization system 106 applies continuous transformations (e.g., orientation changes or size changes) as described above with regard to FIG. 5B. For example, based on user interaction with a texture per segment element (e.g., "unique textures"), the color image texturization system 106 assigns a unique texture to each texture segment in the color texture map 706. Based on user interaction with a texture transformation element (e.g., "continuous textures"), the color image texturization system 106 assigns a texture transformation to different colors or hues within a texture segment in the color texture map 706. As illustrated in FIG. 7, the color texture map 706 reflects user selection of the texture per segment element and does not include texture transformations in the textured segments.

FIG. 7 further illustrates inclusion of the opacity customization element 720. As mentioned previously, the color image texturization system 106 provides an option to automatically modulate opacity of a texture pattern base on the saturation of a pixel value in the digital image. The color image texturization system 106 further provides options for user customization of texture pattern opacity. For example, the opacity customization element 720 illustrated in FIG. 7 includes an opacity selection element comprising a sliding bar to indicate a target texture pattern opacity. As previously mentioned, in some embodiments, the opacity customization element 720 includes an additional opacity range selection element to select a range of opacity values to be used in the partially textured accessible image. More specifically, the color image texturization system 106 may automatically determine opacity values for texture patterns within a selected range.

Figure 8:
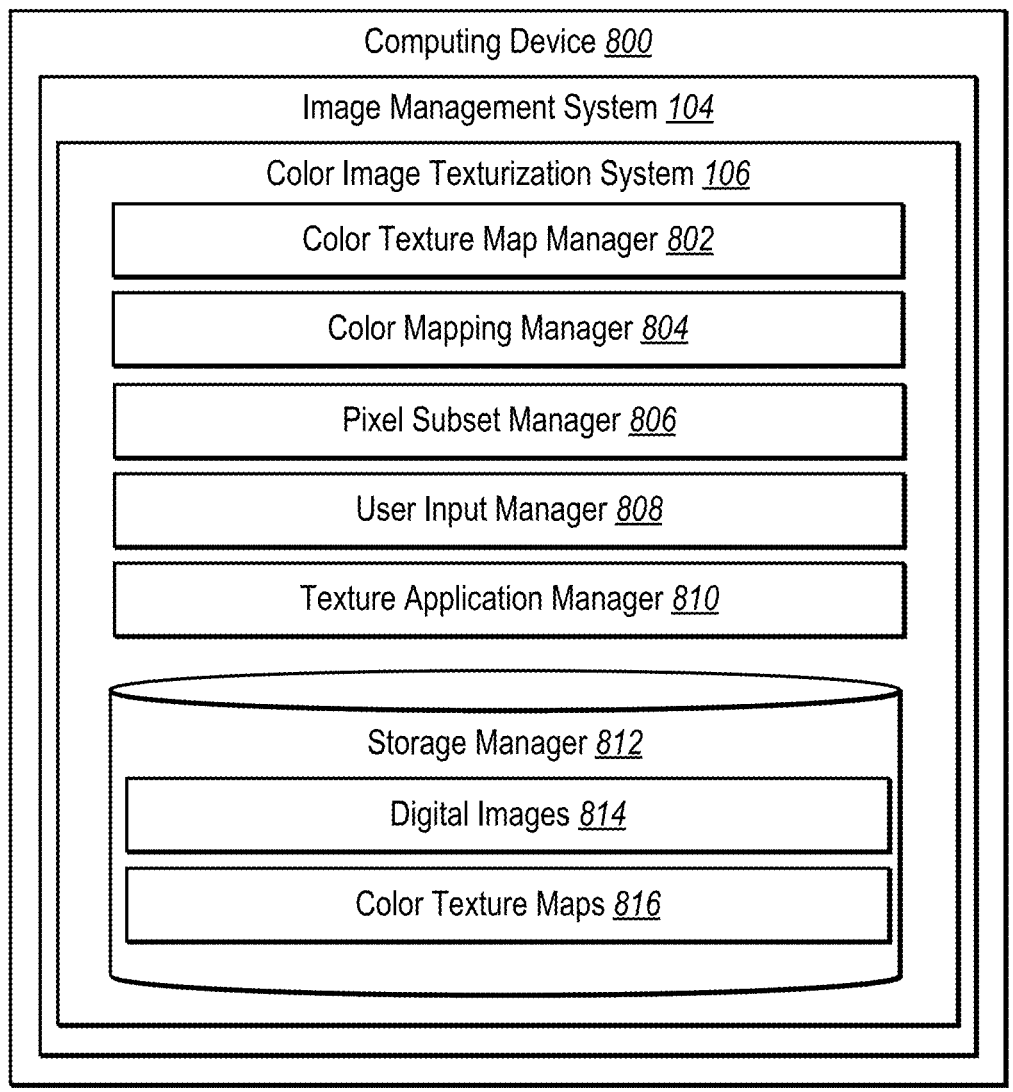
FIG. 8 illustrates a schematic diagram of an example architecture of the color image texturization system in accordance with one or more embodiments of the present disclosure.

FIG. 8 provides additional detail regarding various components and capabilities of the color image texturization system 106 in accordance with one or more embodiments. Generally, FIG. 8 illustrates the color image texturization system 106 implemented by the image management system 104 on a computing device 800 (e.g., the user client device 108 and/or the server device(s) 102). As shown, the color image texturization system 106 includes, but is not limited to a color texture map manager 802, a color mapping manager 804, a pixel subset manager 806, a user input manager 808, a texture application manager 810, and a storage manager 812. The storage manager 812 stores digital images 814 and color texture maps 816.

The color image texturization system 106 illustrated in FIG. 8 includes the color texture map manager 802. The color texture map manager 802 accesses and/or generates color texture maps. The color texture map manager 802 determines textured segments and assigns textures to the textured segments. The color mapping manager 804 maps a plurality of colors from a digital image to a color texture map. The pixel subset manager 806 identifies a first subset of pixels having colors mapped to a textured segment of colors. In some embodiments, the pixel subset manager 806 also identifies a second subset of pixels having colors mapped to an untextured segment. The user input manager 808 manages user input and customizes a color map based on user input. The texture application manager 810 applies texture to a first subset of pixels to generate a partially textured accessible image. The storage manager 812 stores the digital images 814 comprising colored digital images. The storage manager 812 also includes the color texture maps 816 having textured segments and untextured segments.

In some embodiments, the color image texturization system 106 is implemented as part of the image management system 104 in a distributed system of the server devices for generating partially textured accessible images. Additionally, or alternatively, the color image texturization system 106 is implemented on a single computing device such as the server device(s) 102 or the user client device 108 of FIG. 1.

In one or more embodiments, each of the components of the color image texturization system 106 are in communication with one another using any suitable communication technologies. Additionally, the components of the color image texturization system 106 are in communication with one or more other devices including the user client device 108 illustrated in FIG. 1. Although the components of the color image texturization system 106 are shown as separate in FIG. 8, any of the subcomponents may be combined into fewer components, such as into a single component or divided into more components as may serve a particular implementation. Furthermore, although the components of FIG. 8 are described in connection with the color image texturization system 106, at least some components for performing operations in conjunction with the color image texturization system 106 described herein may be implemented on other devices within the environment.

The components of the color image texturization system 106 can include software, hardware, or both. For example, the components of the color image texturization system 106 can include one or more instructions stored on a computer-readable storage medium and executable by processors of one or more computing devices (e.g., the user client device 108). When executed by the one or more processors, the computer-executable instructions of the color image texturization system 106 can cause the computing devices to perform the textured accessible image generation methods described herein. Alternatively, the components of the color image texturization system 106 can comprise hardware, such as a special purpose processing device to perform a certain function or group of functions. Additionally, or alternatively, the components of the color image texturization system 106 can include a combination of computer-executable instructions and hardware.

Furthermore, the components of the color image texturization system 106 performing the functions described herein with respect to the color image texturization system 106 may, for example, be implemented as part of a stand-alone application, as a module of an application, as a plug-in for applications, as a library function or functions that may be called by other applications, and/or as a cloud-computing model. Thus, the components of the color image texturization system 106 may be implemented as part of a stand-alone application on a personal computing device or a mobile device. Alternatively, or additionally, the components of the color image texturization system 106 may be implemented in any application that provides image management, including, but not limited to ADOBE CREATIVE CLOUD, such as ADOBE AERO, ADOBE INDESIGN, ADOBE COLOR, ADOBE ILLUSTRATOR, and ADOBE PHOTOSHOP. The foregoing are either registered trademarks or trademarks of Adobe Inc. in the United States and/or other countries.

Figure 9:
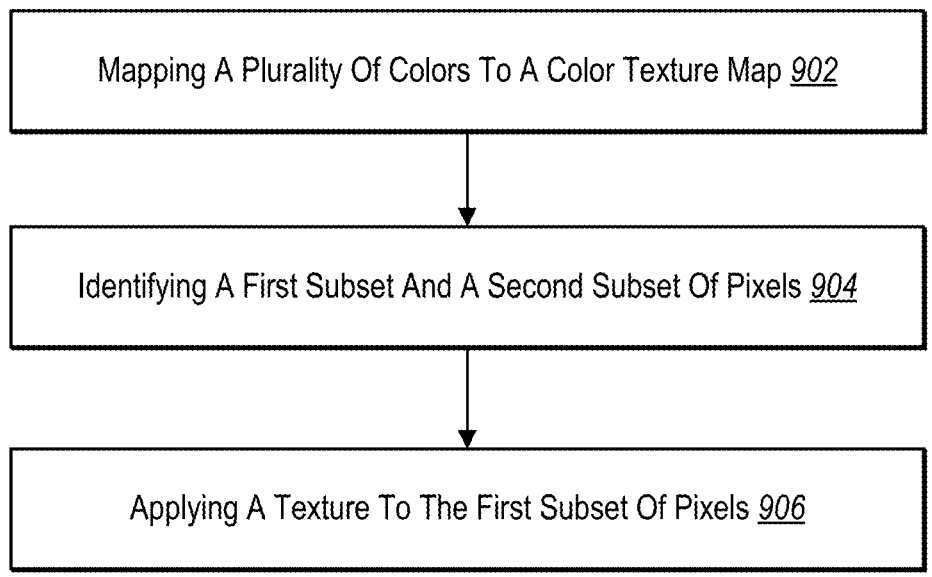
FIGS. 9-10 illustrate series of acts for generating partially textured accessible images in accordance with one or more embodiments of the present disclosure.
Figure 10:
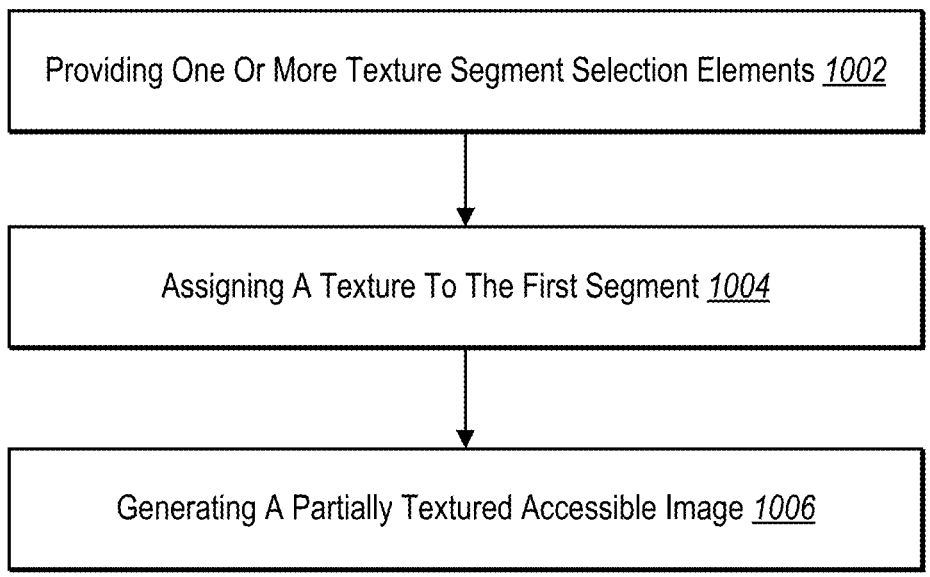

FIGS. 1-8, the corresponding text, and the examples provide a number of different methods, systems, devices, and non-transitory computer-readable media of the color image texturization system 106. In addition to the foregoing, one or more embodiments can also be described in terms of flowcharts comprising acts for accomplishing the particular result, as shown in FIGS. 9-10. The series of acts illustrated in FIGS. 9-10 may be performed with more or fewer acts. Further, the illustrated acts may be performed in different orders. Additionally, the acts described herein may be repeated or performed in parallel with one another or in parallel with different instances of the same or similar acts.

FIG. 9 illustrates a flowchart of a series of acts 900 for generating a partially textured accessible image. The series of acts 900 includes an act 902 of mapping a plurality of colors to a color texture map. In particular, the act 902 comprises mapping the plurality of colors to a color texture map, wherein the color texture map divides a color space into a textured segment of colors and an untextured segment of colors according to a color deficiency boundary. In some embodiments, the color deficiency boundary corresponding to the color texture map comprises a white point color deficiency boundary determined based on a white point and a copunctual point of the color space. In some embodiments, the color texture map further comprises additional segments divided by one or more additional color deficiency boundaries, wherein the one or more additional color deficiency boundaries comprise confusion color deficiency boundaries determined based on confusion lines that intersect the white point color deficiency boundary within the color space.

In some embodiments, the color texture map divides the color space into an additional textured segment and an additional untextured segment and further comprising: identifying a third subset of pixels from the plurality of pixels having colors mapped to the additional textured segment; and applying an additional texture to the third subset of pixels to generate the partially textured accessible image.

In some embodiments, the act 902 further comprises determining the textured segment of colors and the untextured segment of colors by: providing, for display via a color vision deficiency preferences user interface, one or more texture segment selection elements; and in response to user interaction with the one or more texture segment selection elements, assigning the texture to the textured segment of colors of the color texture map.

The series of acts 900 includes an act 904 of identifying a first subset and a second subset of pixels. In particular, the act 904 comprises identifying a first subset of pixels from the plurality of pixels having colors mapped to the textured segment of colors and a second subset of pixels from the plurality of pixels having colors mapped to the untextured segment of colors.

The series of acts 900 further includes an act 906 of applying a texture to the first subset of pixels. In particular, the act 906 comprises applying a texture to the first subset of pixels to generate the partially textured accessible image. In some embodiments, applying the texture comprises: determining a first texture transformation corresponding to a first color of the textured segment of colors; determining a second texture transformation corresponding to a second color of the textured segment of colors; and applying the first texture transformation to the texture of a first pixel of the first subset of pixels having the first color and the second texture transformation to a second pixel of the first subset of pixels having the second color. More specifically, in some embodiments, applying the first texture transformation comprises applying a first orientation to the texture of the first pixel; and applying the second texture transformation comprises applying a second orientation to the texture of the second pixel.

The series of acts 900 may comprise additional acts of providing, for display via a color vision deficiency preferences user interface, one or more visual property selection elements; and in response to user interaction with the one or more visual property selection elements, customize visual properties of the texture to the textured segment of colors. The series of acts 900 may further include additional acts comprising capturing the digital image from a real-world scene via a camera device of an augmented reality device; and applying the texture to the first subset of pixels by providing a texture overlay for display relative to the real-world scene via the augmented reality device. The series of acts 900 may further include additional acts comprising identifying the digital image from a virtual reality scene portrayed via a virtual reality device; and applying the texture to the first subset of pixels within the virtual reality scene.

FIG. 10 illustrates a series of acts 1000 for generating a partially textured accessible image based on user interaction with texture segment selection elements. The series of acts 1000 includes an act 1002 of providing one or more texture segment selection elements. In particular, the act 1002 comprises providing, for display via a color vision deficiency preferences user interface, one or more texture segment selection elements.

The series of acts 1000 includes an act 1004 of assigning a texture to the first segment. In particular, the act 1004 comprises in response to user interaction with the one or more texture segment selection elements, assigning a texture to the first segment of colors of the color texture map. In some embodiments, the color texture map further comprises additional segments of colors divided by one or more additional color deficiency boundaries, wherein: the color deficiency boundary comprises a white point color deficiency boundary determined based on a white point and a copunctual point of the color space; and the one or more additional color deficiency boundaries comprise confusion color deficiency boundaries determined based on confusion lines that intersect the white point color deficiency boundary. In some embodiments, the additional segments of colors comprise a textured segment and an untextured segment, wherein the textured segment is complementary to the untextured segment within the color space.

The series of acts 1000 includes an act 1006 of generating a partially textured accessible image. In particular, the act 1006 comprises generating a partially textured accessible image from the digital image by mapping the plurality of pixels of the digital image to the first segment of colors and the second segment of colors.

In some embodiments, the series of acts 1000 further comprises acts comprising: mapping a first subset of pixels from the plurality of pixels to the first segment of colors; mapping a second subset of pixels from the plurality of pixels to the second segment of colors; generating textured pixels from the first subset of pixels by applying the texture; and generating the partially textured accessible image from the textured pixels and the second subset of pixels. Additionally, in some embodiments, the series of acts 1000 comprises an additional act of assigning an additional texture to the textured segment of the color texture map in response to additional user interaction with the one or more texture segment selection elements.

Furthermore, the series of acts 1000 may comprise an additional act of generating the partially textured accessible image by generating a texture overlay comprising the texture at pixel locations corresponding with the first segment of colors. The series of acts 1000 may further comprise an additional act of converting initial colors of the digital image to colors of the color space, wherein the color space comprises a CIE xyY color space.

In addition (or in the alternative to) the acts described above, in some embodiments, the series of acts 900 and/or the series of acts 1000 include a step for generating a partially textured accessible image. For example, the acts described in reference to FIG. 2 can comprise the corresponding acts (or structure) for performing a step for generating the partially textured accessible image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
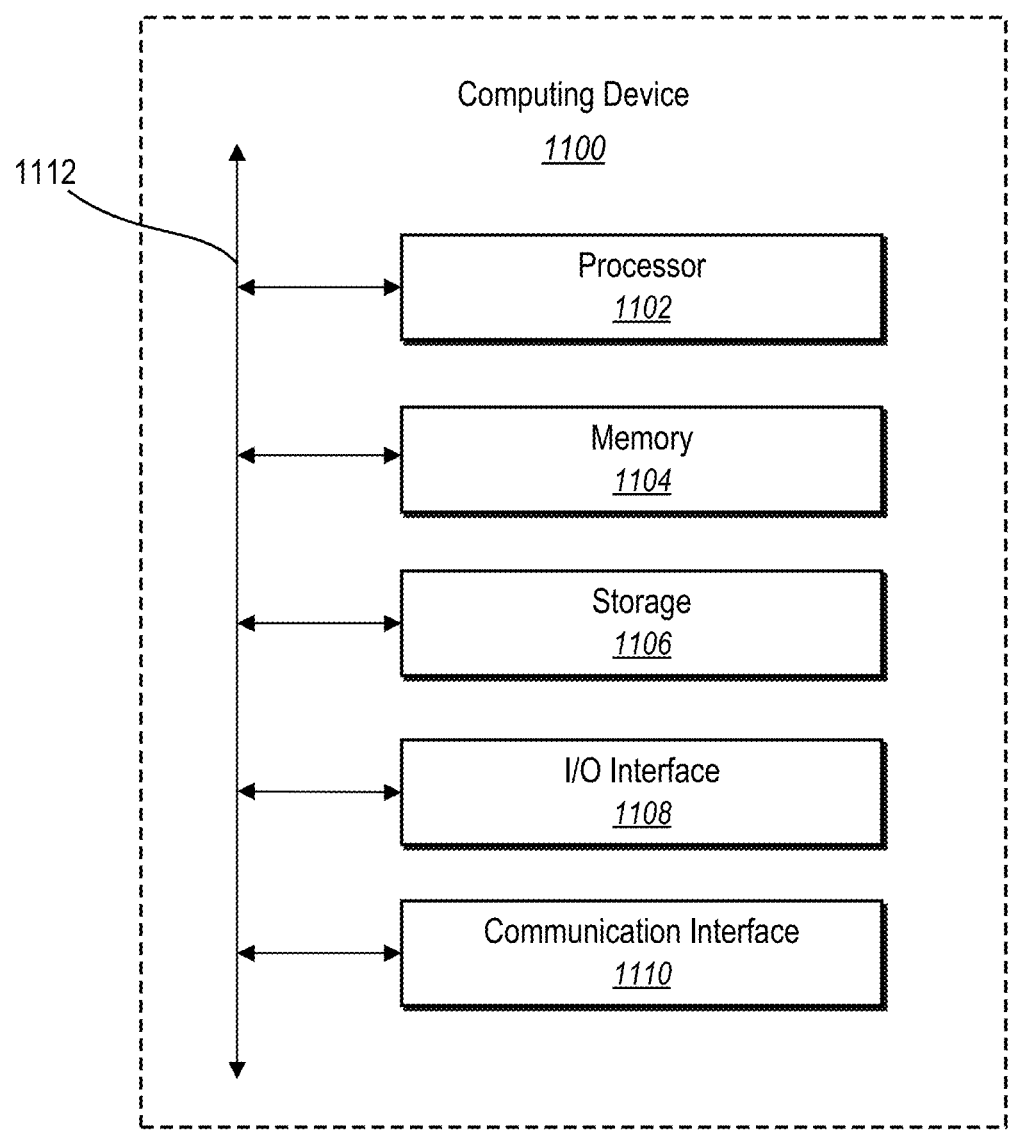
FIG. 11 illustrates a block diagram of an example computing device in accordance with one or more embodiments of the present disclosure.

FIG. 11 illustrates a block diagram of a computing device 1100 that may be configured to perform one or more of the processes described above. One will appreciate that one or more computing devices such as the computing device 1100 may implement the color image texturization system 106 and the image management system 104. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the image modification process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computing device to generate a partially textured accessible image from a digital image comprising a plurality of pixels having a plurality of colors by performing operations comprising:
- mapping the plurality of colors to a color texture map, wherein the color texture map divides a color space into a textured segment of colors and an untextured segment of colors according to a color deficiency boundary;
- identifying a first subset of pixels from the plurality of pixels having colors mapped to the textured segment of colors and a second subset of pixels from the plurality of pixels having colors mapped to the untextured segment of colors; and
- applying a texture to the first subset of pixels to generate the partially textured accessible image.

2. The non-transitory computer readable medium recited in claim 1, further comprising mapping the plurality of colors to the color texture map, wherein the color deficiency boundary corresponding to the color texture map comprises a white point color deficiency boundary determined based on a white point and a copunctual point of the color space.

3. The non-transitory computer readable medium recited in claim 2, further comprising mapping the plurality of colors to the color texture map, wherein the color texture map further comprises additional segments divided by one or more additional color deficiency boundaries, wherein the one or more additional color deficiency boundaries comprise confusion color deficiency boundaries determined based on confusion lines that intersect the white point color deficiency boundary within the color space.

4. The non-transitory computer readable medium recited in claim 1, wherein the color texture map divides the color space into an additional textured segment and an additional untextured segment and further comprising:
- identifying a third subset of pixels from the plurality of pixels having colors mapped to the additional textured segment; and
- applying an additional texture to the third subset of pixels to generate the partially textured accessible image.

5. The non-transitory computer readable medium recited in claim 1, wherein applying the texture comprises:
- determining a first texture transformation corresponding to a first color of the textured segment of colors;
- determining a second texture transformation corresponding to a second color of the textured segment of colors; and
- applying the first texture transformation to the texture of a first pixel of the first subset of pixels having the first color and the second texture transformation to a second pixel of the first subset of pixels having the second color.

6. The non-transitory computer readable medium recited in claim 5, wherein:
- applying the first texture transformation comprises applying a first orientation to the texture of the first pixel; and
- applying the second texture transformation comprises applying a second orientation to the texture of the second pixel.

7. The non-transitory computer readable medium recited in claim 1, further storing instructions thereon that, when executed by the at least one processor, cause the computing device to determine the textured segment of colors and the untextured segment of colors by:
- providing, for display via a color vision deficiency preferences user interface, one or more texture segment selection elements; and
- in response to user interaction with the one or more texture segment selection elements, assigning the texture to the textured segment of colors of the color texture map.

8. The non-transitory computer readable medium recited in claim 1, further storing instructions thereon that, when executed by the at least one processor, cause the computing device to:
- provide, for display via a color vision deficiency preferences user interface, one or more visual property selection elements; and
- in response to user interaction with the one or more visual property selection elements, customize visual properties of the texture to the textured segment of colors.

9. The non-transitory computer readable medium recited in claim 1, further comprising:
- capturing the digital image from a real-world scene via a camera device of an augmented reality device; and
- applying the texture to the first subset of pixels by providing a texture overlay for display relative to the real-world scene via the augmented reality device.

10. The non-transitory computer readable medium recited in claim 1, further comprising:
- identifying the digital image from a virtual reality scene portrayed via a virtual reality device; and
- applying the texture to the first subset of pixels within the virtual reality scene.

11. A system comprising:
- at least one storage device comprising:
  - a digital image that includes a plurality of pixels; and
  - a color texture map that divides colors of a color space into a first segment of colors and a second segment of colors according to a color deficiency boundary; and
- at least one processor configured to cause the system to:
  - provide, for display via a color vision deficiency preferences user interface, one or more texture segment selection elements;
  - in response to user interaction with the one or more texture segment selection elements, assign a texture to the first segment of colors of the color texture map; and
  - generate a partially textured accessible image from the digital image by mapping the plurality of pixels of the digital image to the first segment of colors and the second segment of colors.

12. The system recited in claim 11, wherein the at least one processor is further configured to cause the system to:
- map a first subset of pixels from the plurality of pixels to the first segment of colors;
- map a second subset of pixels from the plurality of pixels to the second segment of colors;
- generate textured pixels from the first subset of pixels by applying the texture; and
- generate the partially textured accessible image from the textured pixels and the second subset of pixels.

13. The system recited in claim 11, wherein the color texture map further comprises additional segments of colors divided by one or more additional color deficiency boundaries, wherein:
- the color deficiency boundary comprises a white point color deficiency boundary determined based on a white point and a copunctual point of the color space; and
- the one or more additional color deficiency boundaries comprise confusion color deficiency boundaries determined based on confusion lines that intersect the white point color deficiency boundary.

14. The system recited in claim 13, wherein the additional segments of colors comprise a textured segment and an untextured segment, wherein the textured segment is complementary to the untextured segment within the color space.

15. The system recited in claim 14, wherein the at least one processor is further configured to cause the system to assign an additional texture to the textured segment of the color texture map in response to additional user interaction with the one or more texture segment selection elements.

16. The system recited in claim 11, wherein the at least one processor is further configured to cause the system to generate the partially textured accessible image by generating a texture overlay comprising the texture at pixel locations corresponding with the first segment of colors.

17. The system recited in claim 11, wherein the at least one processor is further configured to cause the system to convert initial colors of the digital image to colors of the color space, wherein the color space comprises a CIE xyY color space.

18. A computer-implemented method comprising:
receiving an image comprising a plurality of pixels having a plurality of colors;
a step for generating a partially textured accessible image from the image; and
providing the partially textured accessible image for display, the partially textured accessible image comprising a first subset of textured pixels and a second subset of untextured pixels.

19. The computer-implemented method recited in claim 18, further comprising generating the first subset of textured pixels by variably blending a texture with the plurality of pixels utilizing a color-variant opacity.

20. The computer-implemented method recited in claim 18, wherein providing the partially textured accessible image for display comprises providing, for display, the first subset of textured pixels in a virtual reality scene via a virtual reality device.

* * * * *